(12) United States Patent
Nix

(10) Patent No.: US 6,535,231 B1
(45) Date of Patent: Mar. 18, 2003

(54) METHOD FOR CONTROLLING A MULTI-STATE PROCESS IN A COMPUTER SYSTEM

(75) Inventor: Todd Nix, Austin, TX (US)

(73) Assignee: Dell Computer Corporation, Round Rock, TX (US)

( * ) Notice: Subject to any disclaimer, the term of this patent is extended or adjusted under 35 U.S.C. 154(b) by 0 days.

(21) Appl. No.: 08/788,669

(22) Filed: Jan. 24, 1997

(51) Int. Cl.⁷ .................................................. G06F 3/14
(52) U.S. Cl. ........................ 345/835; 345/839; 345/797; 345/764; 345/781
(58) Field of Search .................................. 345/348, 349, 345/965, 970, 967, 345, 339, 440, 835, 839, 797, 764, 781; 364/188, 146

(56) References Cited

U.S. PATENT DOCUMENTS

| 5,129,057 A | * | 7/1992 | Strope et al. ................. 34/348 |
| 5,241,655 A | * | 8/1993 | Mineki et al. ............... 345/354 |
| 5,301,348 A | * | 4/1994 | Jaaskelainen et al. ....... 345/348 |
| 5,497,455 A | * | 3/1996 | Suga et al. .................. 345/348 |
| 5,559,947 A | | 9/1996 | Wugofski |
| 5,576,946 A | * | 11/1996 | Bender et al. ............... 364/188 |

OTHER PUBLICATIONS

Quickstart 1–2–3 The original Step–by–Step Tutorial, QUE Corp., 1994, pp. 262–263.*

\* cited by examiner

*Primary Examiner*—Kristine Kincaid
*Assistant Examiner*—Thomas T. Nguyen
(74) *Attorney, Agent, or Firm*—Haynes and Boone, LLP

(57) ABSTRACT

A method of controlling a multi-state process in a computer system includes displaying a series of icons having corresponding titles representing phases in a build process. A main action message bar displays a title indicating an action which corresponds to the title of one of the icons. When the bar is activated the action indicated is performed, and the icon title corresponding to the last performed action is highlighted.

13 Claims, 6 Drawing Sheets

METHOD FOR CONTROLLING A MULTI-STATE PROCESS IN A COMPUTER SYSTEM

BACKGROUND

The disclosures herein relate generally to a computer system interface and more particularly to an interface for controlling a multi-state process to enable a system operator having minimum training to control the flow or operation of the process.

Graphic user interfaces (GUIs) are well known and include the use of graphic elements, or icons, to represent applications and functions used in computer systems. Typically, an icon is manipulated by a user, using a mouse to click-on the icon and activate a task. The icons may be highlighted or dimmed to indicate that a particular icon is in use or disabled.

An advantage of such GUI systems is that the user can operate a computer system with only basic knowledge of computers since such systems are very user friendly. By referencing an icon for a specific task or a series of icons for a series of tasks, a complete operation can be accomplished. This would be beneficial in factory and plant operations where users without specific computer skills can be trained to control the flow or operation of a process by use of a GUI system. Such operation can be in the form of a state machine to determine phases of a build process.

Therefore, what is needed is a simplified interface method for controlling a multi-state process to enable a user without specific computer knowledge or training in the process, to control the flow or operation of the process.

SUMMARY

One embodiment, accordingly, provides a method for controlling a multi-state process in a computer system which enables a user with minimum training to control the flow or operation of the process. To this end, a method of controlling a multi-state process in a computer system includes the steps of displaying a series of icons representing phases in a build process, displaying a main action message bar indicating an action to be performed in response to activating the bar, and activating the bar to perform the action indicated.

A principal advantage of this embodiment is that it provides a user interface to determine which phases of the build process have been completed and which phase should be executed next. This enables a user with minimum training to control the flow or operation of the process. Such minimum training includes basic familiarity with PC's and commercially available operating systems and software processes.

DESCRIPTION OF THE PREFERRED EMBODIMENT

Figure 1:
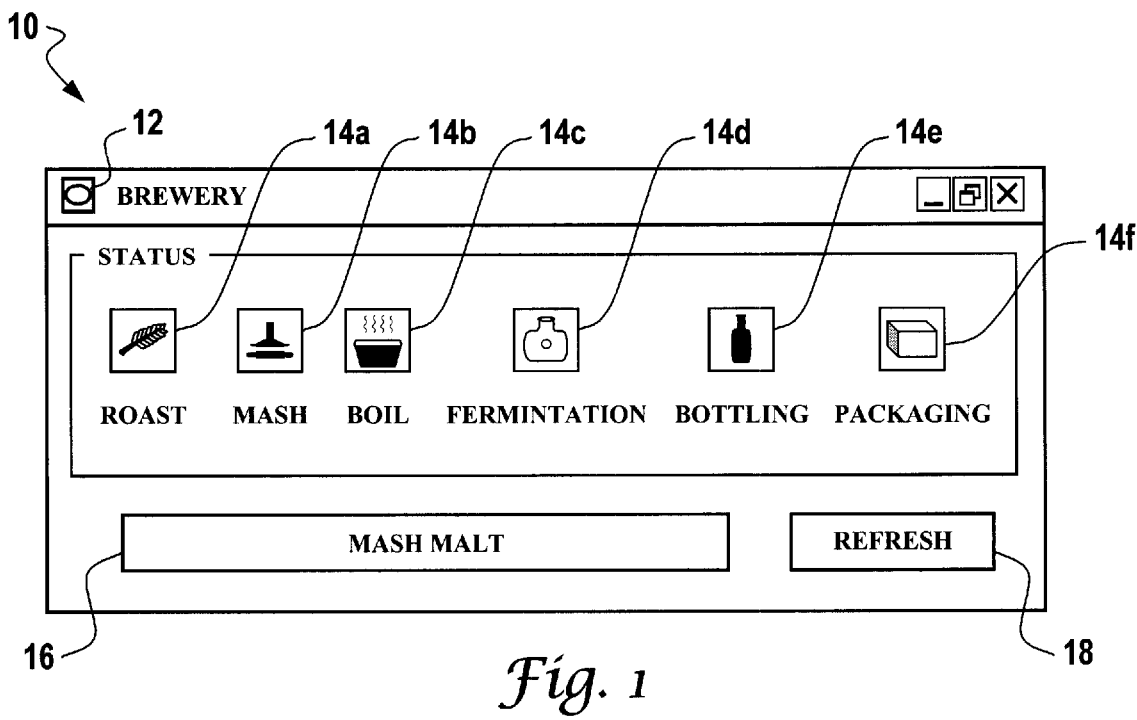
FIG. 1 is a view illustrating an embodiment of a computer screen display of the process.

Referring to FIG. 1, a computer screen display is depicted and generally designated 10. Screen 10 includes a title bar 12, a series of icons 14a, 14b, 14c, 14d, 14e and 14f, a main action message bar or button 16 and a refresh bar or button 18. The foregoing includes a user interface to determine which phases of a build process have been completed and which phase should be executed next. Icons 14a–14f represent phases of the process, and the icons or their titles are highlighted to indicate either readiness and/or completion of a task. When the icons 14a–14f are dimmed, they represent phases of the process which are incomplete. The refresh bar 18 prompts a recalculation of the current state of the process. The action bar 16 prompts the one appropriate action based on the state of the process. A title displayed on action bar 16 is changed to display what next action will be performed if the action bar 16 is activated. Action bar 16 is dimmed and disabled if no action is available or the build process is complete. The title of the dimmed action bar 16 also explains why the bar 16 is dimmed.

Figure 1A:
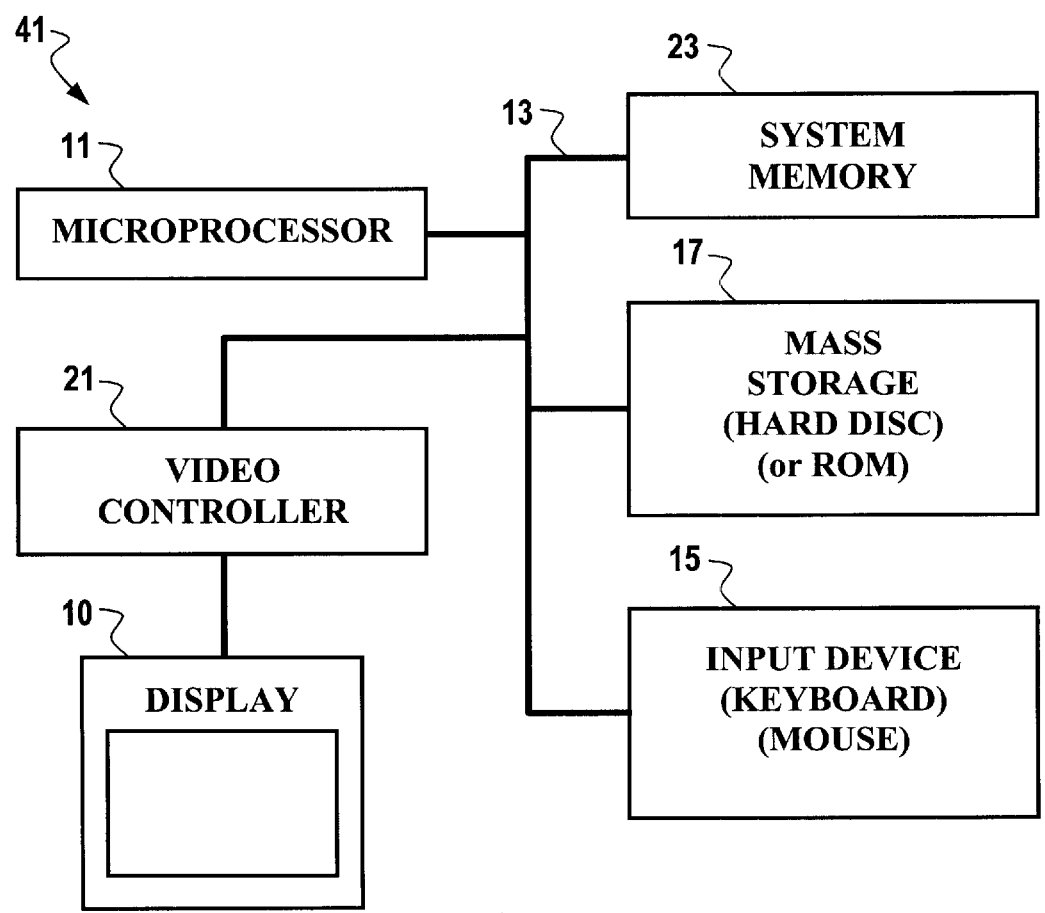
FIG. 1a is a diagrammatic view illustrating an embodiment of a computer system for controlling the process.

In one embodiment, the foregoing user interface process is applicable to a computer system 41, FIG. 1a, in the form of a software or firmware program. System 41 includes a microprocessor 11 which is connected to a bus 13. Bus 13 serves as a connection between microprocessor 11 and other components of computer system 41. An input device 15 is coupled to microprocessor 11 to provide input to microprocessor 11. Examples of input devices include keyboards, touchscreens, and pointing devices such as mouses, trackballs and trackpads. Programs and data are stored on a mass storage device 17 which is coupled to microprocessor 11. Mass storage devices include such devices as hard disks, optical disks, magneto-optical drives, floppy drives, ROMs and the like. Computer system 41 further includes the display 10 which is coupled to microprocessor 11 by a video controller 21. A system memory 23 is coupled to microprocessor 11 to provide the microprocessor with fast storage to facilitate execution of computer programs by microprocessor 11. It should be understood that other busses and intermediate circuits can be deployed between the components described above and microprocessor 11 to facilitate interconnection between the components and the microprocessor.

Figure 2:
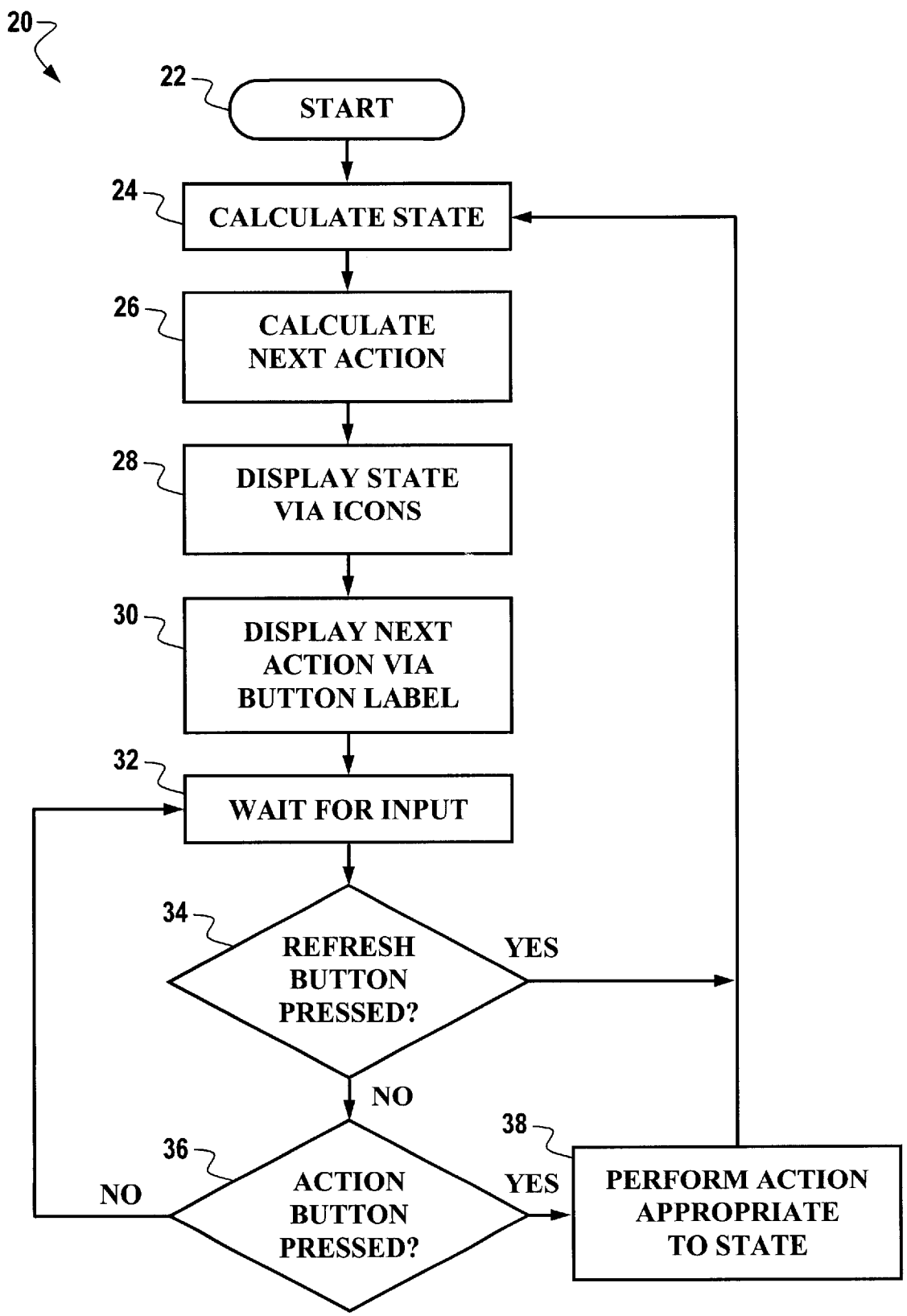
FIG. 2 is a diagrammatic view illustrating an embodiment of a flow chart of the process.

In FIG. 2, a flow chart designated 20 generally describes the process. After the process is started as indicated at block 22, the next action is to calculate the state of the process as indicated at block 24 based on what has been done in the process. Based on the state calculated as indicated at block 24, the next function calculation occurs as indicated at block 26. The state of the process is displayed by dimming and/or highlighting the icons 14a–14f, FIG. 1, as indicated at block 28, FIG. 2. The action bar 16, FIG. 1, displays a label depicting what the next action will be as is indicated at block 30, FIG. 2. At this point, the user must input an action as indicated at block 32. That is, the user must either click on the action bar 16, FIG. 1, indicating that the process is to move on to the next state or the user must click on the refresh bar 18, when it is known that the state has changed but the action bar 16 or one of the icons 14a–14f, do not indicate a state change. If the user clicks on refresh bar 18, the process returns via the refresh function as indicated at a block 34, FIG. 2, to the calculate state as indicated at block 24. If the user clicks on the action bar 16, FIG. 1, the process passes from the action function as indicated at a block 36, FIG. 2, to a block designated 38 which indicates performance of the action appropriate to the state of the process, after which the process returns to the calculate state as indicated at block 24.

Figure 3:
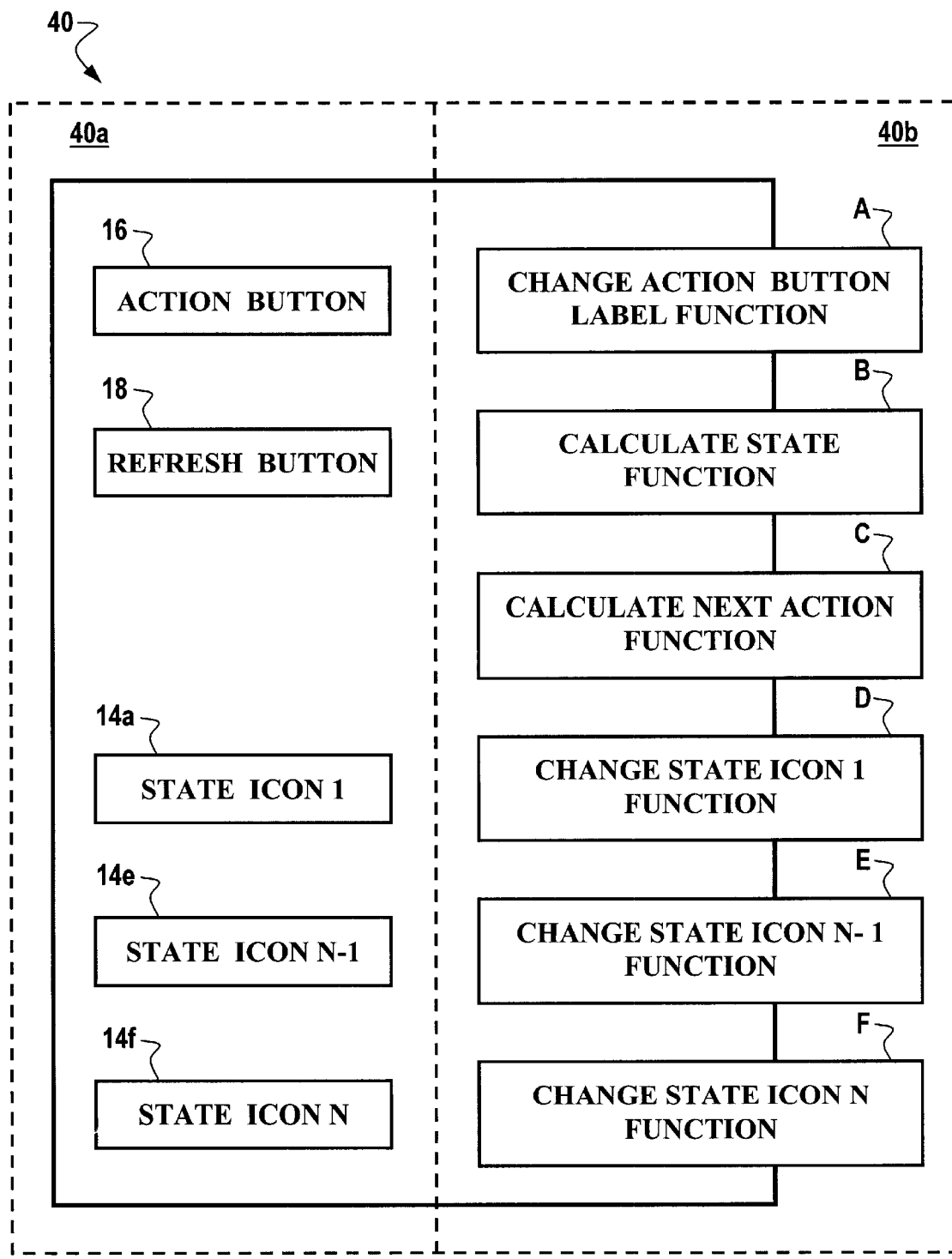
FIG. 3 is a diagrammatic view illustrating an embodiment of a block diagram of the process.

Referring to FIG. 3, a block diagram designated 40 includes a first portion 40a which corresponds to interface display 10, FIG. 1, and a second portion 40b which corresponds to flow chart 20 of FIG. 2. In portion 40a, action bar 16, FIGS. 1 and 3 includes a label depicting what next action will be performed when action bar 16 is activated. When the operator clicks on the action bar 16, the next action occurs. Activation of the refresh bar 18 recalculates the state of everything when it is known that the state has changed but the action bar 16 or one of the icons 14a–14f do not indicate a state change. The exemplary phases of the process are represented by icons 14a, 14e, 14f, whose titles are highlighted to indicate either readiness or completion of a task, or are dimmed to indicate phases of the process which are incomplete. In portion 40b, the title or label displayed on the action bar is changed to display what action will be performed if the action bar is activated, see step A, FIG. 3. The next step B is to calculate the state of the process based on what has been completed. Based on the state calculated, the next function calculation occurs as indicated at step C. The state of the process is displayed by dimming or highlighting of the icons represented at steps D, E and F.

Figure 4:
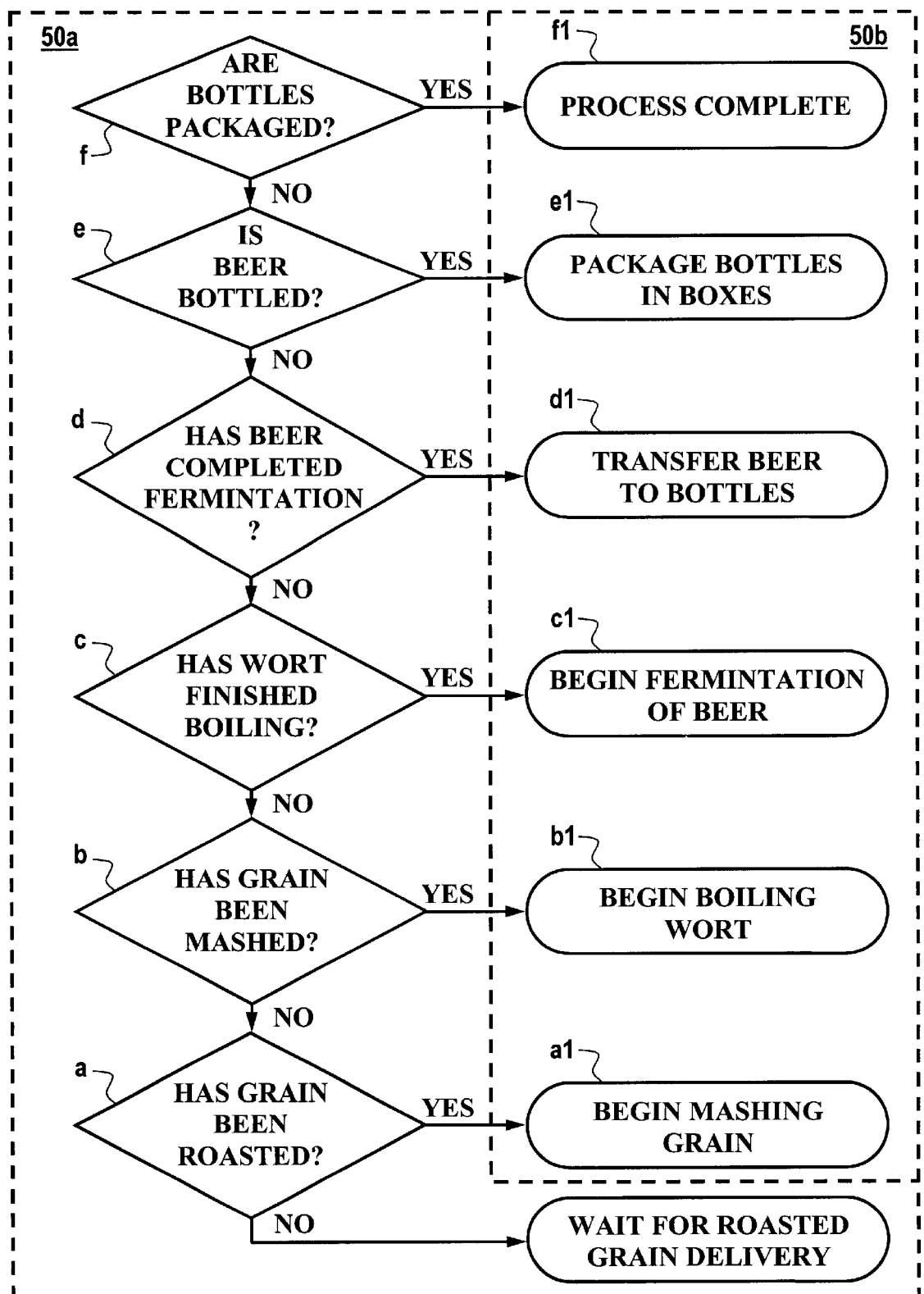
FIG. 4 is a diagrammatic view illustrating an embodiment of a flow chart of an application of the process.

An example of the utility of this process is illustrated in FIG. 4 describing a flow chart analysis of a brewery process. The process, generally designated 50 includes a calculate state portion 50a and a calculate next action portion 50b. Steps or states of the process in portion 50a correspond to icons 14a–14f. That is, step "a" corresponds to icon 14a, step "b" corresponds to icon 14b, and so on. Although this example is for a linear process, the disclosures herein may be used for a non-linear process also.

By referring to portion 50a, it can be seen that a grain roasting step is indicated at step "a", a grain mashing step is indicated at step "b", a wort boiling step is indicated at step "c", a fermentation step is indicated at step "d", a bottling step is indicated at step "e" and a packaging step is indicated at step "f". Similarly, by referring to portion 50b, the next action calculation can occur based on the state calculated as indicated in portion 50a. For example, it can be seen that when the calculated state indicates that the grain has been roasted, step "a", the next action of mashing the grain can begin as indicated at step a1. When the calculated state indicates that the grain is mashed, step "b", the next action of wort boiling can begin as indicated at step b1. When wort boiling, step "c", finishes, fermentation begins, step c1. When fermentation is completed, step "d", beer is bottled, step d1. When beer bottling is completed, step "e", packaging begins, step e1. When packaging is completed, step "f", the process is completed, step f1.

This process is exemplified by the user interface illustrated in FIGS. 1 and 5–8. FIG. 1, as previously discussed, includes icons 14a–14f. From the screen display 10 in FIG. 1, it becomes apparent, from reference to highlighted action button 16, that the title displayed, i.e. mash malt, is the next action to be performed if the action bar 16 is activated. Also it is apparent that icon 14a is highlighted to indicate completion of the task of roasting the grain. Icons 14b–14f remain dimmed indicating phases of the process which are incomplete. For the sake of brevity, we will not discuss each and every step but will discuss a sufficient number of the steps to clearly illustrate the operation of the method.

Figure 5:
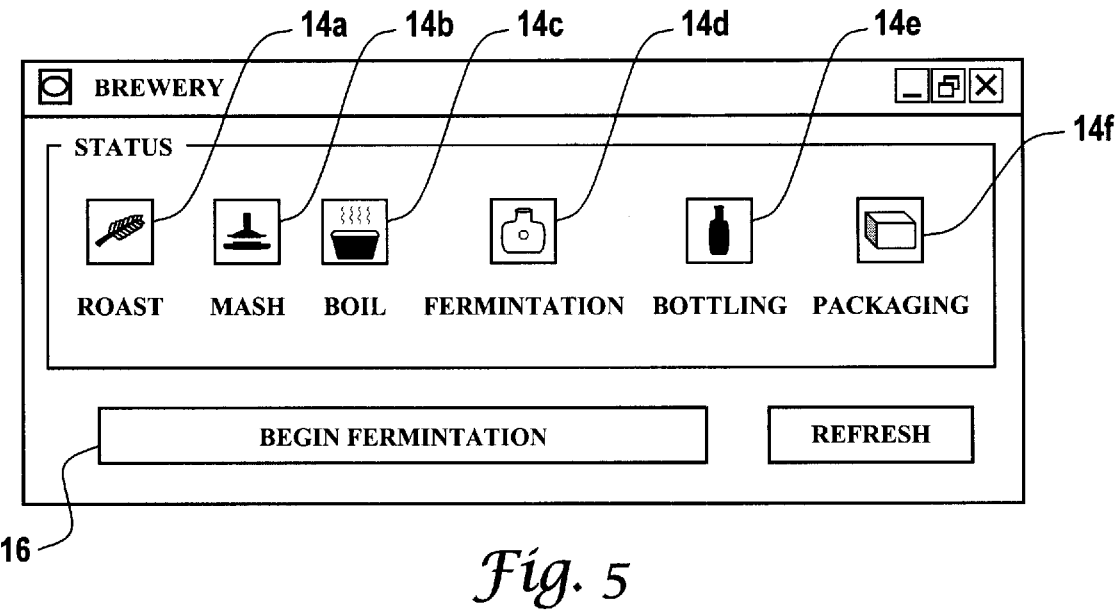
FIG. 5 is another view illustrating an embodiment of a computer screen display of the process.

In FIG. 5, screen display 10 informs the user, by referring to the highlighted action bar 16, that the title displayed, i.e. begin fermentation, is the next action to be performed. Icons 14a–14c are highlighted to indicate completion of the tasks of roasting, mashing and boiling, whereas icons 14d–14f are dimmed indicating phases of the process which are incomplete.

Figure 6:
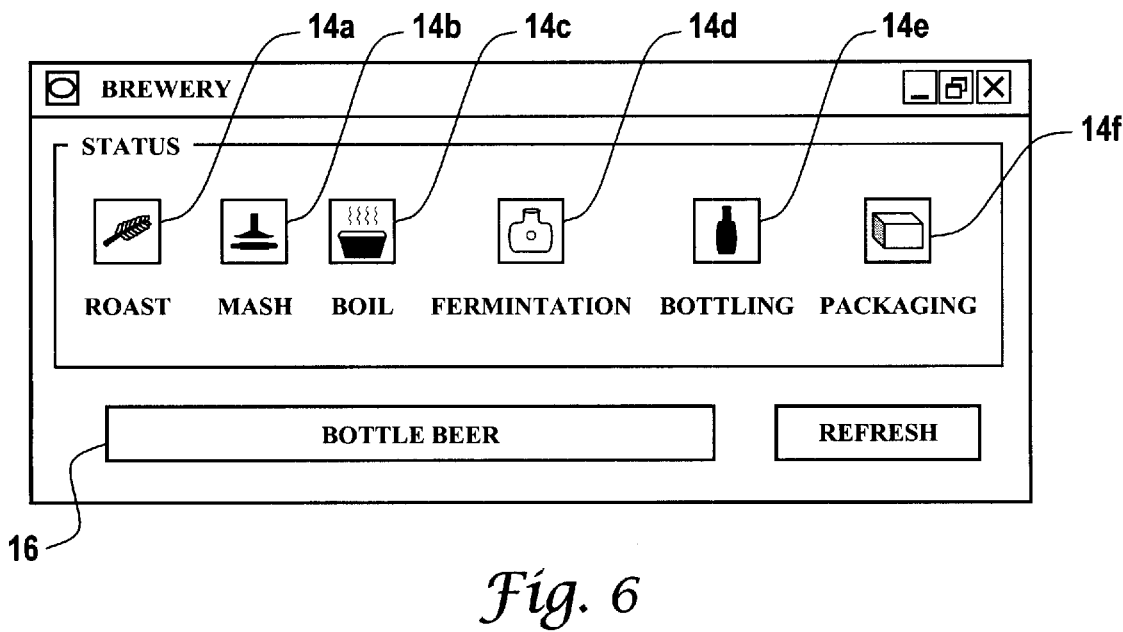
FIG. 6 is a further view illustrating an embodiment of a computer screen display of the process.

In FIG. 6, screen display 10 informs the user, by referring to the highlighted action bar 16, that the title displayed, i.e. bottle beer, is the next action to be performed. Icons 14a–14d are highlighted to indicate completion of the tasks of roasting, mashing, boiling and fermenting, whereas icons 14e–14f are dimmed indicating phases of the process which are incomplete.

Figure 7:
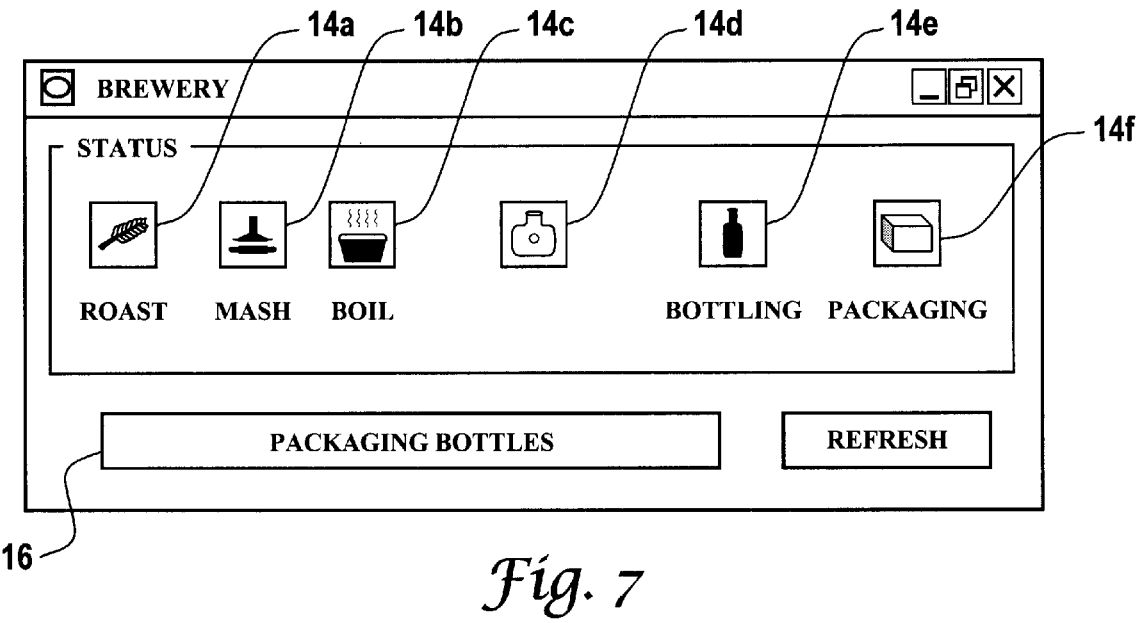
FIG. 7 is a still further view illustrating an embodiment of a computer screen display of the process.

Also, in FIG. 7, screen display 10 informs the user, by referring to the highlighted action bar 16, that the title displayed, i.e. packaging bottles, is the next action in the process to be performed. Icons 14a–14e are highlighted to indicate completion of the tasks of roasting, mashing, boiling, fermenting, and bottling, whereas icon 14f is dimmed indicating the last phase of the process which is incomplete.

Figure 8:
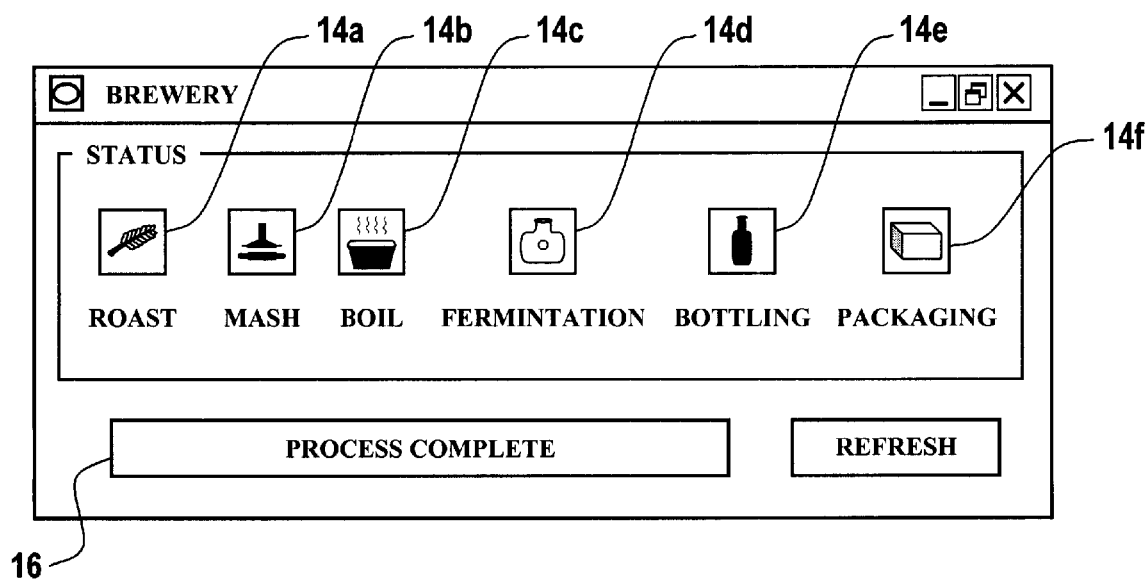
FIG. 8 is an even further view illustrating an embodiment of a computer screen display of the completed process.

Finally, in FIG. 8, screen display 10 informs the user, by referring to dimmed action bar 16, that the build process is complete. Icons 14a–14f are highlighted to indicate completion of all the tasks of the process.

As it can be seen, the user interface illustrated in the embodiments determines which phases of a build process have been completed and which phase should be executed next. The icons 14a–14f represent the phases of the process and their titles are highlighted to indicate readiness and/or completion of a task. The dimmed icons represent phases which are incomplete. There are two user action bars. The main action bar 16 performs the one appropriate action based on the state of the process. The main action bar 16 is dimmed and disabled if no action is available or if the build process is complete. The title of the dimmed bar 16 is also modified to explain why the bar 16 is dimmed, i.e. process complete.

The method disclosed herein has been embodied as a software tool used at Dell Computer Corporation for generating operating system factory install packages. This tool was built using Microsoft Visual C++ and Microsoft Visual Basic and was designed to run on Microsoft Windows NT or Microsoft Windows 95.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of controlling a multi-state process in a computer system comprising the steps of:

displaying a series of icons representing phases in a build process;

displaying a main action message bar indicating an action to be performed in response to activating the bar;

activating the bar to perform the action indicated; and automatically pausing between each discrete action.

2. The method of controlling a process as defined in claim 1 wherein the step of displaying icons comprises the step of displaying a title corresponding to each icon.

3. The method of controlling a process as defined in claim 1 further comprising the step of highlighting the icons which correspond to the completed actions.

4. The method of controlling a process as defined in claim 1 further comprising the step of dimming the icons which represent phases of the process which are incomplete.

5. The method of controlling a process as defined in claim 1 further comprising the step of dimming the message bar when the process is complete.

6. The method of controlling a process as defined in claim 1 further comprising the step of activating a refresh bar to recalculate the state of the process.

7. The method of controlling a process as defined in claim 1 wherein the step of automatically pausing between each discrete action remains paused until activation of the main action message bar.

8. A method of controlling a multi-state process in a computer system comprising the steps of:

displaying a series of icons having corresponding titles representing phases in a build process;

displaying a main action message bar title indicating an action to be performed in response to activating the bar;

activating the bar to perform the action indicated; and automatically pausing between each discrete action.

9. The method of controlling a multi-state process as defined in claim 8 wherein the step of automatically pausing between each discrete action remains paused until activation of the main action message bar.

10. The method of controlling a process as defined in claim 8 further comprising the step of highlighting the icon titles corresponding to the completed actions.

11. The method of controlling a process as defined in claim 8 further comprising the step of dimming the icon titles which represent phases of the process which are incomplete.

12. The method of controlling a process as defined in claim 8 further comprising the step of dimming the message bar title when the process is complete.

13. The method of controlling a process as defined in claim 8 further comprising the step of activating a refresh bar to recalculate the state of the process.

* * * * *